J. F. CAMPBELL.
CUTTING TOOL FOR BORING OR DRILLING MACHINES.
APPLICATION FILED OCT. 26, 1908.
918,003.
Patented Apr. 13, 1909.
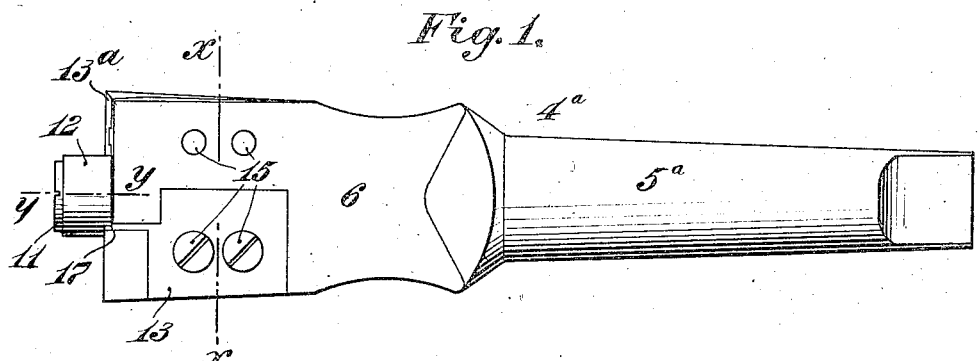
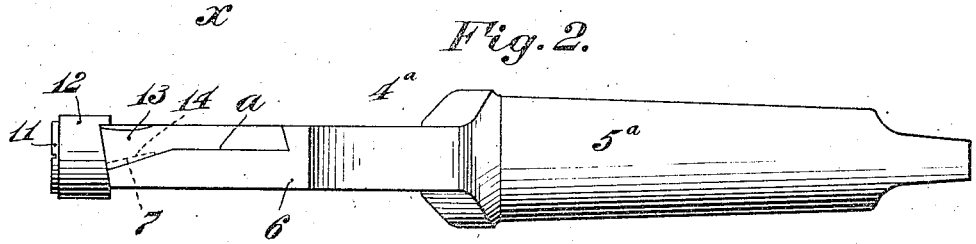
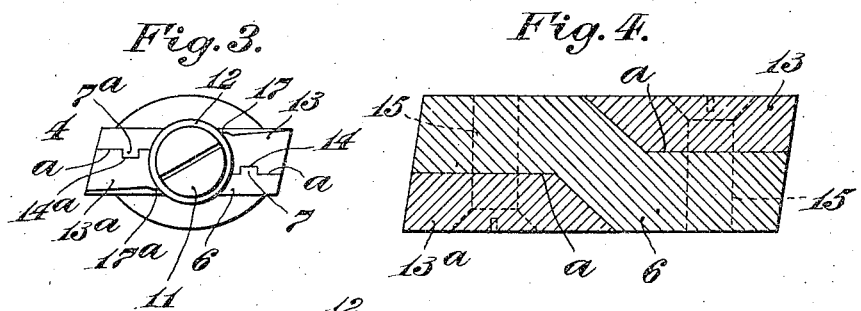
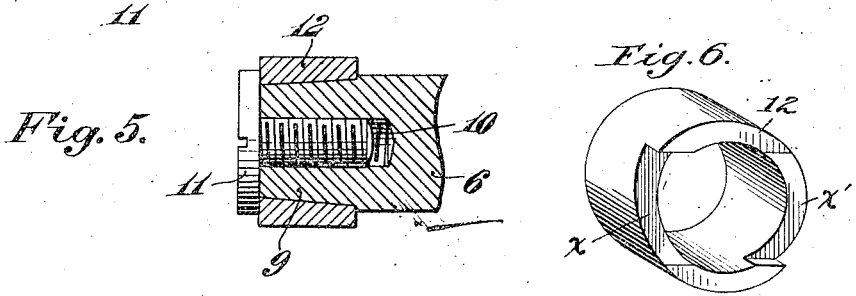
WITNESSES:
Thomas M. Smith
G. M. Connerton
INVENTOR
Joseph F. Campbell,
BY
J. Walton Douglas
ATTORNEY.

UNITED STATES PATENT OFFICE.

JOSEPH F. CAMPBELL, OF PHILADELPHIA, PENNSYLVANIA.

CUTTING-TOOL FOR BORING OR DRILLING MACHINES.

No. 918,003.  Specification of Letters Patent.  Patented April 13, 1909.

Application filed October 26, 1908. Serial No. 459,511.

*To all whom it may concern:*

Be it known that I, JOSEPH F. CAMPBELL, a citizen of the United States, residing at the city of Philadelphia, in the county of Philadelphia, in the State of Pennsylvania, have invented certain new and useful Improvements in Cutting-Tools for Boring or Drilling Machines, of which the following is a specification.

My invention has relation to an expanding tool for employment in a boring machine or drilling press for providing by cutting away of metal an opening in a piece or block of metal by ripping or shredding such metal by the tool in the formation of the opening therein; and in such connection, my said invention relates more particularly to the constructive arrangement thereof for the defined purposes.

The nature, characteristic features and scope of my present invention will be more fully understood from the following description taken in connection with the accompanying drawings forming part hereof, in which—

Figure 1, is a side elevational view of a ripping, cutting or shredding tool, for employment in a boring machine or drilling press embodying the main features of my said invention, showing the removable cutting or shredding blades, and removable bushing at the end. Fig. 2, is a side elevational view of the tool, at a right angle to Fig. 1. Fig. 3, is a front end elevational view. Fig. 4, is a transverse sectional view of the tool, on the line $x$, $x$, of Fig. 1. Fig. 5, is a longitudinal sectional view through the threaded shank of the tool for detachably securing the end bushing thereto, showing the manner of arranging the parts on the tool or shank; and Fig. 6, is a perspective view of the bushing detached, showing one edge recessed or offset on both sides thereof.

Referring to the drawings 4$^a$, is a tool embodying in its structural arrangement the particular features of my said invention, comprising preferably a hardened steel stock 5$^a$, with a thick flat body 6, cut away at $a$, $a$, on both sides, respectively, and having integrally formed therewith tongues 7, 7$^a$, and a front end smooth surface shank 9, internally bored out with the wall threaded at 10, to receive a corresponding threaded and headed bolt 11, for holding a bushing 12, in required operative position, by friction, and by means of the head of the bolt 11, on the shank 9, as clearly shown in Fig. 5. In the cutaway surfaces on both sides of the stockbody 6, are provided threaded openings, for the insertion of a series of screws 15.

13 and 13$^a$, are two beveled edge ripping, cutting or shredding blades, having on the underside of both longitudinal grooves 14, 14$^a$, arranged to mesh with the tongues 7 and 7$^a$, of the stock-body 6. The arrangement of the shank 9, of the tool 4$^a$, is such, as that by removing the bolt 11, the bushing 12, can be readily removed and either a thicker or thinner bushing substituted. The bushing 12, in one edge is recessed or offset at $x$, $x^1$, on both sides so that in position the bushing not only snugly fits against the ends of the blades 13 and 13$^a$, but also prevent possible movement or turning of the said blades from the ends thereof, in position on the stock-body 6, during operation of the tool.

The pitch of the working edges of the blades 13 and 13$^a$, in position in connection with the stock-body 6, for the ripping or shredding operations upon the piece or block of metal to be acted upon is such, as to avoid, as far as possible, in the actions, revolving at a comparatively high speed, the rapid wear of the same. Both of the blades 13 and 13$^a$, in one portion may be offset at 17 and 17$^a$, to engage the bushing 12, to aid in firmly holding the bushing 12, on the shank 9 of the tool.

Having thus described the nature and object of my invention, what I claim as new and desire to secure by Letters Patent is:—

1. A tool of the character described, comprising a stock provided with a body having a tongue and end shank, a bushing mounted on the stock-shank and having one edge recessed, blades having grooves to engage the tongues of said stock and recesses of said bushing and means to detachably secure said blades to said stock, substantially as and for the purposes described.

2. A tool of the character described, comprising a stock having offsets and tongues and a shank, a bushing adapted to be removably supported on said shank and one edge recessed on both sides, blades having respectively, beveled edges, irregular bodies and underneath grooves adapted to engage the
5 tongues of said stock and means to removably hold said blades to said stock, substantially as and for the purposes described.

In witness whereof, I have hereunto set my signature in the presence of two subscribing witnesses.

JOSEPH F. CAMPBELL.

Witnesses:
   J. WALTER DOUGLASS,
   THOMAS M. SMITH.